Dec. 18, 1956  E. J. WAGNER  2,774,925
ELECTRIC MOTOR SPEED CONTROL SYSTEM
Filed April 29, 1953

INVENTOR.
Edward J. Wagner

United States Patent Office 2,774,925
Patented Dec. 18, 1956

2,774,925

ELECTRIC MOTOR SPEED CONTROL SYSTEM

Edward J. Wagner, Berwyn, Ill., assignor to Dormeyer Corporation, Chicago, Ill., a corporation of Illinois Application April 29, 1953, Serial No. 351,940

2 Claims. (Cl. 318—250)

The present invention relates to fractional horsepower universal motors such as are suitable for use in household appliances, etc. and concerns itself more particularly with the speed regulation and circuit controls therefor.

Series wound fractional horsepower motors lend themselves to driving household food mixers and similar appliances because of their load-speed characteristics in which high speed is attainable yet maximum torque is available at low speed. However, one of the problems in applications of this kind is to provide an inexpensive speed control which will deliver low speed under light loads as well as power under heavy loads. Centrifugal type governors are used, but the cost thereof is high. Brush shift controls do not assure low speed under light loads because of the rising speed curve under light loads. Tapped fields involve reduced power and line rheostats also involve cost and do not appreciably affect the load speed curve within the expected operating range.

One of the characteristics of a series would motor is that as the field is strengthened in relation to the armature, a lower speed results. This is the basis for the tapped field coil. However, such does not increase torque because the load and speed on the armature controls the current consumed.

One of the objects of the present invention is to utilize the advantages of brush shift speed control and the tapped field, yet eliminate the disadvantages of both by shunting the armature with a fixed resistance at the low speed position of the brush shift control and thereby not only lower the speed regardless of load but also increase the torque by increasing the effective wattage consumption in the field coil at least partially independently of the armature reaction.

A further object of the invention is to weaken the relative strength of the field at other speeds to attain a favorable change in the rising speed characteristic at high speeds further induced by advancing the commutation by brush shifting.

Another object of the present invention is to improve the effective torque in single phase series wound motors by diminishing the relative magnetic strength of the armature in combination with a favorable change in commutation to minimize distortion effects upon the field flux and reduce brush arcing.

Another object is to improve the life of inexpensive food mixer motors and improve their performance.

Another object is to provide an improved working combination of elements in inexpensive appliances which are notoriously overloading repeatedly during their life cycle.

Yet another object of the present invention is to provide an efficient yet low cost speed regulating apparatus for fractional horsepower single phase motors of the series type involving the utilization merely of a single shunting resistance and control switch, the presence of which may not affect the stator and rotor characteristics during maximum speed operation.

For a better understanding of how the foregoing and other objects and advantages of the present invention are achieved reference will now be had to the accompanying drawing and to the following description, throughout which like reference numerals represent corresponding parts, and in which.

Figure 5:
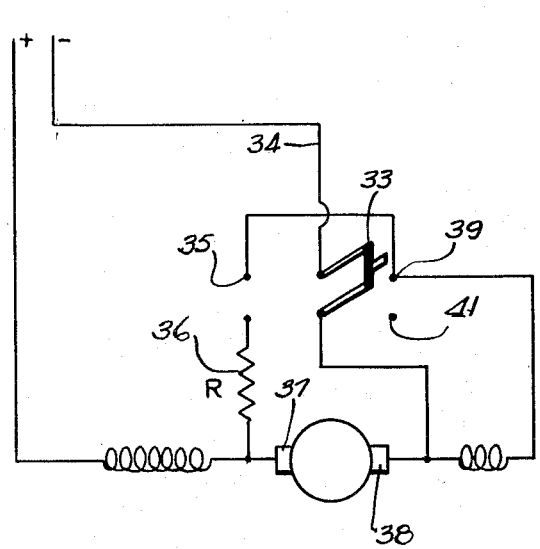
Fig. 5 is a circuit diagram of the modified arrangement contemplated in connection with the apparatus disclosed in Fig. 4.

The field and armature construction of the improved motor may accord with the conventional practises including for example bipolar stacked field laminations with a minimum number of turns in the windings of its diametrically opposed pole faces. In keeping with the consequent low field strength the rotor is correspondingly constructed with a sufficiently large number of core projections to develop required torque.

The motor flux and armature current react upon each other to produce torque in the armature. Since these two factors are substantially in phase, the consequent torque may be said to be independent of the power factor. As the commutator segments are engaged by the brushes 11 and 12, Fig. 3, successive coils of the armature winding are brought into circuit connection impressing the motor flux but at the same time other armature coils are short circuited causing to be produced a transformer action which impresses a parasitic load or back electromotive force upon the resulting power factor and produces additional arcing upon the brush terminals.

Users are frequently required to operate food mixers 13 by starting them under their severest load conditions, that is with their mixing bowls 14 charged with batter ingredients of dense consistency and with the blades of their agitator shafts 15 fully submerged. Frequently the electric motor utilized in these classes of apparatus is provided with a shiftable brush carriage or rigging 16 mounted coaxially with the motor shaft and operated by a manual extension 17.

Figure 2:
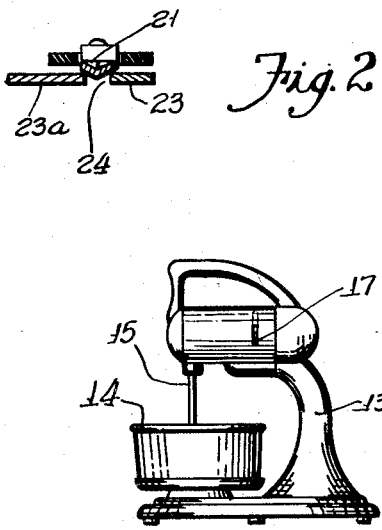
Fig. 2 is a fragmentary sectional view taken approximately on line 2—2 of Fig. 3.
Figure 1:
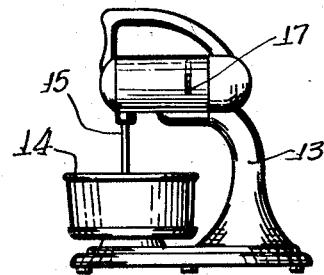
Fig. 1 is a side elevational view of a food mixer embodying a self-contained electric motor which may be constructed in accordance with the features of the present invention.
Figure 3:
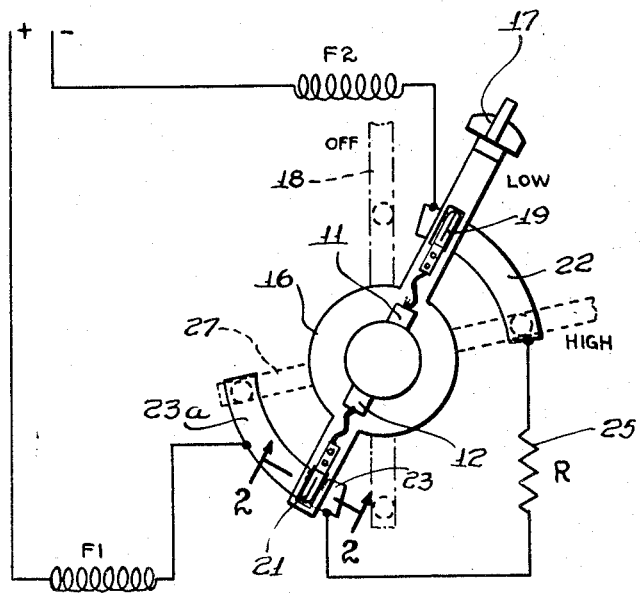
Fig. 3 is a circuit diagram of a motor constructed in accordance with the structure shown in Fig. 1.

The control 17 includes a switch function and is rotated from its inoperative or "off" position indicated at 18, Fig. 3, in a clock-wise direction until its spring contacts 19 and 21 ride onto and electrically engage the segments 22 and 23. It is to be noted that the segment 23 is comprised of two components designated 23 and 23a which are spaced apart by a significant space 24 which is capable of being bridged or electrically closed by the contactor blade 21, Fig. 2, in one position and which imparts to the operator a feeling of detented positioning.

Segment 22 is electrically connected through a fixed resistor 25 with the short segment component 23 so that as the brush carrier or rigging 16 is rotated as aforedescribed no change is produced upon the operating circuit until it reaches the condition in which it is illustrated in Fig. 3 in solid outlines. In this conditon the fixed resistor 25 is connected into the circuit across the brushes 11 and 12 in parallel with the armature with the result that at the low speed position of the brushes, the field winding is strengthened relative to the armature to deliver higher torque and assure a low speed characteristic with light as well as heavy loads.

When the brush carrier 16 is rotated clockwise beyond the position indicated in solid lines, Fig. 3, the bridging of segment components 23a and 23 is relinquished and the contact blade 21 maintains circuit connection with 23a solely. This cuts out the resistor 25 and strengthens the armature relative to the field to increase the speed characteristic of the motor as the brushes are moved to speed advanced positions.

Figure 4:
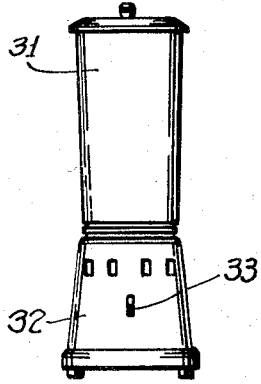
Fig. 4 is a diminutive side elevational view of an electrically operated food blender in which may be utilized a modified concept of the present invention.

In other classes of home appliances where single phase motors of this type are efficiently employed, a wide range of operating speeds is not essential although it may be considered desirable to provide two or more operating speeds and where starting under full load conditions might be necessary without assistance of intervening gear reductions. An example of this type of application is that of a food blender 31, Fig. 4, in which a vertical spindle motor shaft is provided with a series of rotary cutters and agitator blades extending upwardly from a base element 32 which contains the electric motor and which is provided with a control switch 33.

In accordance with the circuit arrangement Fig. 5 it is preferred that control switch 33 be double pole double throw so that at its starting or in one of its preliminary positions the supply line 34 becomes connected with terminal 35 at the same time that the shunting resistance 36 bridges the brushes 37 and 38.

Thus as in the case of the preferred embodiment there will be produced during the starting condition an improved torque and load sustaining characteristic. Thus whether the starting position of switch 33 be one which is provided with or associated with speed reducing means or not, the consequence of bridging motor brushes 37 and 38 with a resistance will nevertheless provide low speed high power operation. After low speed is attained or low speed operation completed and high speed then desired, the control switch 33 may be reversed so as to engage at terminal contacts 39 and 41 to cut the resistance 36 out of circuit and connect the other motor elements for maximum speed operation.

While the present invention has been explained and described with reference to certain contemplated embodiments it will be understood nevertheless that numerous changes and modifications are susceptible of being incorporated without departure from the spirit of the invention, the scope of which is commensurate with the appended claims.

What is claimed is:

1. In an electrical series wound motor having an armature winding, a field winding, and a set of brushes engaging the commutator, means for varying the speed of said motor including a fixed resistance, a shiftable rigging and two arcuate contacts concentric with the armature, contact members mounted on said rigging and movable therewith for engagement of said arcuate contacts, one of said arcuate contacts being bipartite and being divided by a space less than the width of the contact member, said resistance being connected between one section of said bipartite contact and the other of said contacts, whereby said resistance is connected in parallel with the armature when one of said contact members bridges said gap.

2. Apparatus for stabilizing the operation of an alternating current series wound motor having a low self-induction field winding, a commutated armature winding, and a set of brushes engaging the commutator, comprising a shiftable rigging for mounting said brushes, contact members forming a part of said rigging and movable with said brushes, a pair of arcuate contact rings adapted to be engaged by said contact members, one of said rings being bipartite in construction and having a gap bridgable by one of said contact members in one position of said rigging, a resistance connected between one section of said bipartite ring and the other of said pair of rings, whereby said resistance is connected in parallel with the armature when said contact member bridges said gap.

References Cited in the file of this patent

UNITED STATES PATENTS

| | | |
|---|---|---|
| 387,194 | Waterhouse | July 31, 1888 |
| 897,538 | Janisch et al. | Sept. 1, 1908 |
| 1,138,299 | Leake | May 4, 1915 |
| 1,501,558 | Hunt | July 15, 1924 |
| 2,099,554 | Bean | Nov. 16, 1937 |